(12) United States Patent
Adachi (10) Patent No.: US 11,130,226 B2
(45) Date of Patent: Sep. 28, 2021

(54) ARM STRUCTURE OF ROBOT AND ROBOT

(71) Applicant: Fanuc Corporation, Yamanashi (JP)

(72) Inventor: Satoshi Adachi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 255 days.

(21) Appl. No.: 16/287,460

(22) Filed: Feb. 27, 2019

(65) Prior Publication Data

US 2019/0291268 A1 Sep. 26, 2019

(30) Foreign Application Priority Data

Mar. 20, 2018 (JP) .............................. JP2018-052808

(51) Int. Cl.
*B25J 9/04* (2006.01)
*B25J 9/10* (2006.01)
*B25J 9/00* (2006.01)

(52) U.S. Cl.
CPC ............. *B25J 9/042* (2013.01); *B25J 9/0024* (2013.01); *B25J 9/108* (2013.01)

(58) Field of Classification Search
CPC ........... B25J 9/042; B25J 9/0024; B25J 9/108
See application file for complete search history.

(56) References Cited

U.S. PATENT DOCUMENTS 7,841,256 B2 * 11/2010 Hama ..................... B25J 9/06
74/490.05
2008/0016979 A1 1/2008 Yasumura et al.
2008/0034920 A1 * 2/2008 Inoue ................... B25J 17/0283
74/665 M
2013/0305869 A1 11/2013 Krumbacher
(Continued)

FOREIGN PATENT DOCUMENTS

EP 1880809 A1 1/2008
EP 1886773 A1 2/2008
(Continued)

OTHER PUBLICATIONS

Features of the Cross-Roller Ring, THK Co., Ltd., URL: <https://tech.thk.com/en/products/pdf/en_a18_002.pdf>, pp. 2-4, Retrieved Feb. 27, 2019.
(Continued)

*Primary Examiner* — Khoi H Tran
*Assistant Examiner* — Rodney P King
(74) *Attorney, Agent, or Firm* — Shackelford, Bowen, McKinley & Norton, LLP (57) ABSTRACT

The arm structure of a robot includes a first motor and a second motor attached to an arm member, a first bearing attached to the arm member, an arm member supported on the arm member by the first bearing, a first gear rotating together with the first bearing, a first motor transmission gear transmitting rotation force of the first motor to the first gear, a second bearing attached to the arm member and having a center axis perpendicular to a center axis of the first bearing, a rotary member supported on the arm member by the second bearing and rotatable relative to the arm member, a second gear attached to the rotary member, and a second motor transmission gear transmitting rotation force of the second motor to the second gear to make the rotary member rotate.

4 Claims, 6 Drawing Sheets

(56) References Cited

U.S. PATENT DOCUMENTS

| | | | |
|---|---|---|---|
| 2015/0013491 A1* | 1/2015 | Mori | B25J 17/0258 74/490.03 |
| 2017/0252920 A1 | 9/2017 | Motomura et al. | |

FOREIGN PATENT DOCUMENTS

| | | |
|---|---|---|
| JP | S59-166493 A | 9/1984 |
| JP | S62-015089 A | 1/1987 |
| JP | S63-070896 U | 5/1988 |
| JP | H07-052074 A | 2/1995 |
| JP | 2006-102898 A | 4/2006 |
| JP | 2008-23642 A | 2/2008 |
| JP | 4233578 B2 | 3/2009 |
| JP | 5734360 B2 | 6/2015 |
| WO | WO-2016084178 A1 | 6/2016 |

OTHER PUBLICATIONS

Model RU (Integrated Inner/Outer Ring Type), THK Co., Ltd., <https://tech.thk.com/en/products/pdf/en_a18_020.pdf>, pp. 20-30, Retrieved Feb. 27, 2019.

Ishikawa, Kaoru; Notice of Reasons for Refusal; Japanese Patent Application No. 2018-052808; dated Mar. 3, 2020; 4 pages.

AIRI; Search Report by Registered Search Organization; Japanese Patent Application No. 2018-052808; dated Feb. 26, 2020; 7 pages.

\* cited by examiner

ARM STRUCTURE OF ROBOT AND ROBOT

CROSS-REFERENCE TO RELATED APPLICATIONS

This application is based on and claims priority to Japanese Patent Application No. 2018-052808 filed on Mar. 20, 2018, the content of which is incorporated herein by reference in its entirety.

TECHNICAL FIELD

The present invention relates to an arm structure of a robot and the robot.

BACKGROUND ART

Conventional arm structures include a proximal arm member, a distal arm member supported on the proximal arm member and configured to swing relative to the proximal arm member, and a rotary member, such as a wrist flange, attached to a distal end of the distal arm member and configured to rotate relative to the distal arm member.

One known example of these arm structures is comprised of a first motor attached to a proximal end of a proximal arm member, a first bearing attached to a distal end of the proximal arm member, a distal arm member supported on the distal end of the proximal arm member by the first bearing, a first gear positioned coaxially with the first bearing, plural transmission gears attached to the proximal arm member to transmit rotation force of the first motor to the first gear to make the distal arm member swing about a center axis of the first bearing, a second motor attached to the distal arm member, a second bearing attached to the distal arm member and having a center axis perpendicular to the center axis of the first bearing, and a wrist flange supported on the distal arm member by the second bearing and rotatable relative to the distal arm member. The wrist flange is rotated by the second motor (e.g., see PTL 1).

Another known example of the arm structures has a first motor and a second motor attached to a proximal end of a proximal arm member. Rotation force of the first motor is transmitted by a belt to thereby make a distal arm member swing relative to the proximal arm member. Rotation force of the second motor is transmitted by a belt to thereby make a wrist flange rotate relative to the distal arm member (e.g., see PTL 2).

Still another known example of the arm structures has a first motor and a second motor attached to a proximal arm member. Rotation force of the first motor is transmitted by plural bevel gears to thereby make a distal arm member swing relative to the proximal arm member. Rotation force of the second motor is transmitted by plural transmission gears, which are bevel gears, to thereby make a wrist flange swing relative to the proximal arm member (e.g., see PTL 3).

CITATION LIST

Patent Literature

{PTL 1}
Publication of Japanese Patent No. 5734360
{PTL 2}
Japanese Unexamined Patent Application, Publication No. 2008-023642
{PTL 3}
Publication of Japanese Patent No. 4233578

SUMMARY OF INVENTION

According to a first aspect of the present disclosure, there is provided an arm structure of a robot including: a proximal arm member; a first motor attached to the proximal arm member; a second motor attached to the proximal arm member; a first bearing attached to a distal end of the proximal arm member, the first bearing having a center axis substantially parallel to an axis of an output shaft of the first motor; a distal arm member supported on the distal end of the proximal arm member by the first bearing; a first gear positioned coaxially with the first bearing and rotate together with the first bearing; a first motor transmission gear attached to the proximal arm member, the first motor transmission gear transmitting rotation force of the first motor to the first gear to make the distal arm member swing about the center axis of the first bearing; a second bearing attached to the distal arm member, the second bearing having a center axis perpendicular to the center axis of the first bearing; a rotary member supported on the distal arm member by the second bearing, the rotary member being rotatable relative to the distal arm member; a second gear attached to the rotary member and positioned coaxially with the second bearing; and a second motor transmission gear attached to the proximal arm member or the proximal arm member and the distal arm member, the second motor transmission gear transmitting rotation force of the second motor to the second gear to make the rotary member rotate about the center axis of the second bearing.

DESCRIPTION OF EMBODIMENTS

A robot 1 and its arm structure according to an embodiment of the present invention will be explained below with reference to the drawings.

Figure 5:
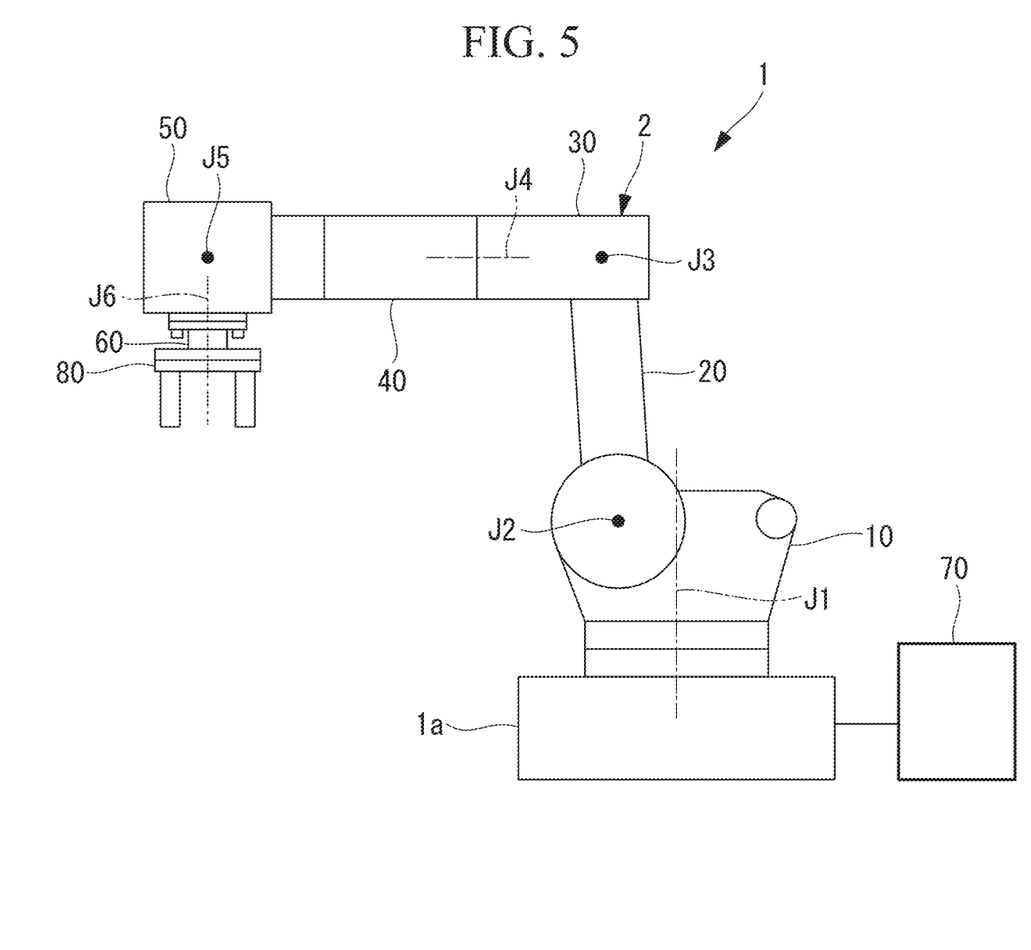
FIG. 5 is a schematic configuration diagram of a robot to which the arm structure of the present embodiment is applied.

As shown in FIG. 5, the robot 1 of the present embodiment includes an arm 2, a controller 70, and a tool 80 attached to an arm member 60 at a distal end of the arm 2.

In the present embodiment, the tool 80 is one typically used for robots, such as a machining tool, an assembling tool, and a measuring tool. Examples of the machining tool include a drilling tool such as an electric drill, a thread forming tool having a tap at its distal end, an electric polishing tool, a painting tool such as a paint gun, and a welding tool such as a servo gun. Examples of the assembling tool include an electric driver and a tool for holding a pin to insert it into a hole. Examples of the measuring tool include a film thickness measuring instrument, an internal inspection device using ultrasound, a hardness measuring instrument, a non-contact thermometer and a close-up camera.

The arm 2 includes plural arm members 10, 20, 30, 40, 50, 60 and plural joints. The arm 2 further includes plural servomotors 11, 21, 31, 41, 51, 61 that respectively drive the plural joints (see FIG. 6). Each servomotor 11, 21, 31, 41, 51, 61 may be one of various servomotors including a rotary motor and a linear motor. Each servomotor 11, 21, 31, 41, 51, 61 includes an operational position detecting device to detect an operational position and an operational speed of a corresponding one of the servomotors 11, 21, 31, 41, 51, 61. The operational position detecting device is, for example, an encoder. Values detected by each operational position detecting device are transmitted to the controller 70.

In the present embodiment, a proximal end of the arm member 10 is supported on a base 1a, and the arm member 10 is rotated by the servomotor 11 about an axis J1 relative to the base 1a. A proximal end of the arm member 20 is supported on a distal end of the arm member 10, and the arm member 20 is swung by the servomotor 21 about an axis J2. A proximal end of the arm member 30 is supported on a distal end of the arm member 20, and the arm member 30 is swung by the servomotor 31 about an axis J3.

Also, a proximal end of the arm member 40 is supported on a distal end of the arm member 30, and the arm member 40 is rotated by the servomotor 41 about an axis J4. A proximal end or an intermediate portion of the arm member 50 is supported on a distal end of the arm member 40, and the arm member 50 is swung by the servomotor 51 about an axis J5. A proximal end of the arm member 60 is supported on a distal end of the arm member 50, and the arm member 60 is rotated by the servomotor 61 about an axis J6.

In the present embodiment, one end of each of the arm members 20, 30, 50 moves along a predetermined path that is centered on the proximal end or the intermediate portion of the corresponding one of the arm members 20, 30, 50. In the present embodiment, this movement is referred to as swing. Meanwhile, axes of the arm members 10, 40, 60 each extending from the proximal end to the distal end are respectively positioned along the axes J1, J4, J6. In other words, the axes J1, J4, J6 extend from the proximal end to the distal end of the arm members 10, 40, 60, respectively. In the present embodiment, movement of the arm members 10, 40, 60 about the respective axes J1, J4, J6 is referred to as rotation.

Figure 6:
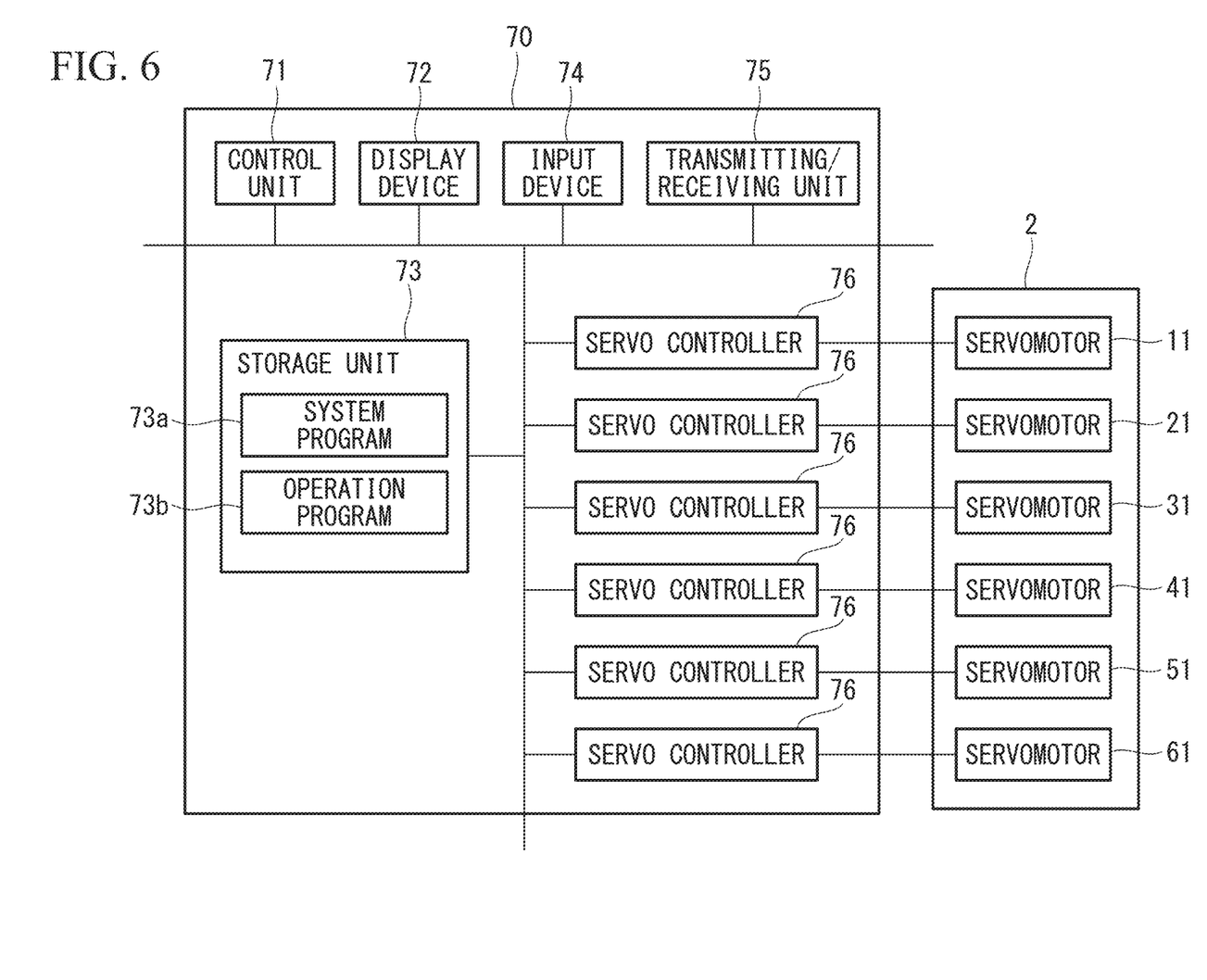
FIG. 6 is a block diagram of a controller of the robot of FIG. 5.

As shown in FIG. 6, the controller 70 includes a control unit 71 including a processor and the like, a display device 72, a storage unit 73 including a non-volatile storage, a ROM, a RAM and the like, an input device 74 such as a keyboard, a touch panel and an operation panel, a transmitting/receiving unit 75 for transmission and reception of signals, and servo controllers 76 connected to the respective servomotors 11, 21, 31, 41, 51, 61. The input device 74 and the transmitting/receiving unit 75 each function as an input unit.

In the present embodiment, the controller 70 is a robot controller to control operations of the robot 1. However, the controller 70 may be any other controller configured as above and provided within or outside a robot controller.

The storage unit 73 stores a system program 73a responsible for basic functions of the controller 70. The storage unit 73 also stores an operation program 73b. Based on the operation program 73b, the control unit 71 transmits control commands to the servo controllers 76 to drive the respective servomotors 11, 21, 31, 41, 51, 61. This causes the arm 2 of the robot 1 to operate based on the operation program 73b.

Next, an explanation will be given of an arm structure used for the robot 1. The arm structure explained below is applied to the arm members 40, 50, and makes the arm member 60 move too. In the arm structure, the arm member 40 is a proximal arm member, and the arm member 50 is a distal arm member. The arm member 60 is a rotary member or a member integrated with a rotary member.

The structures of the arm members 40, 50 are illustrated in FIGS. 1 to 4. Although simplified in FIGS. 1 and 2, each gear includes teeth.

Figure 1:
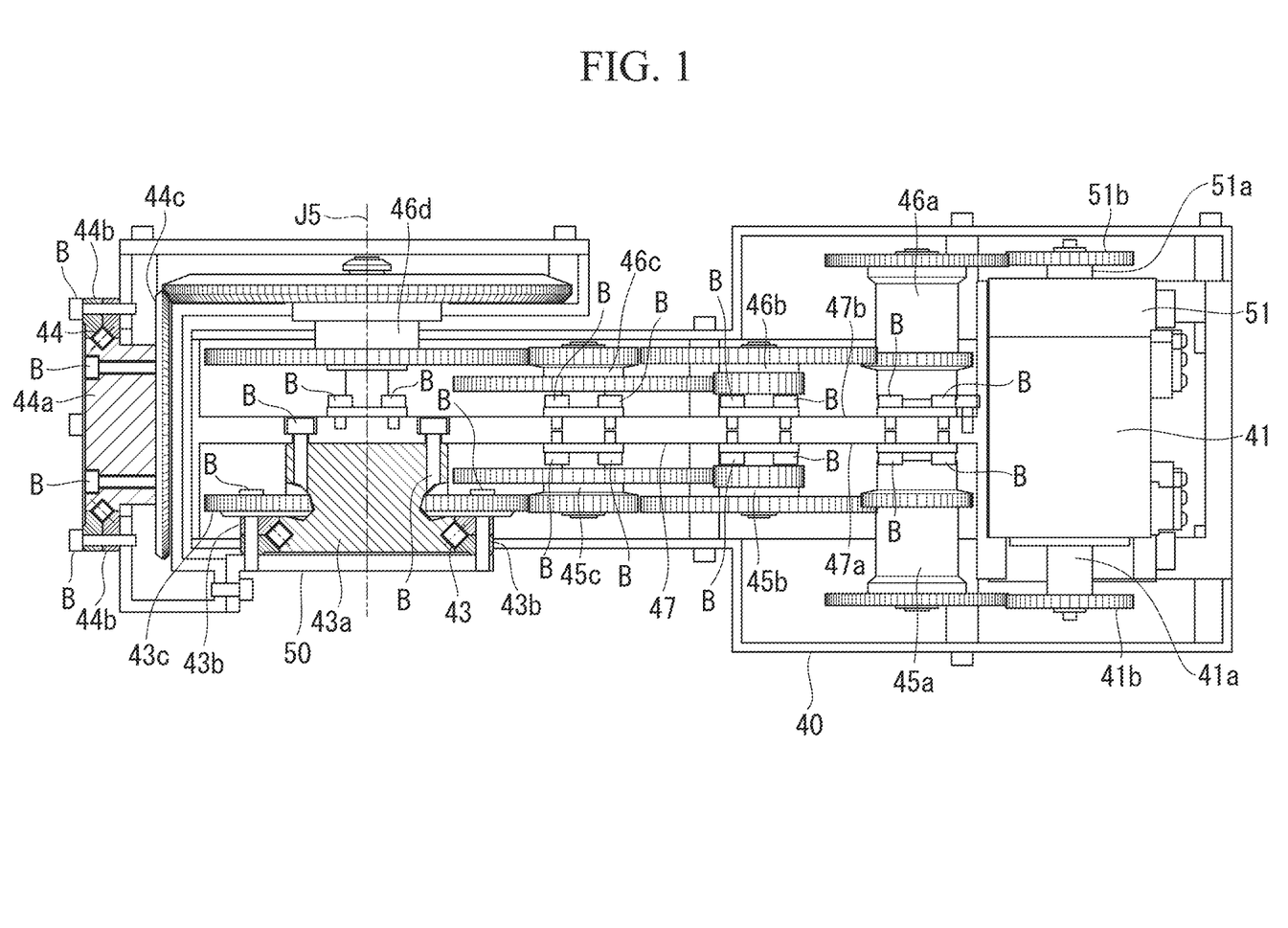
FIG. 1 is a schematic cross-sectional view of an arm structure of an embodiment of the present invention.
Figure 2:
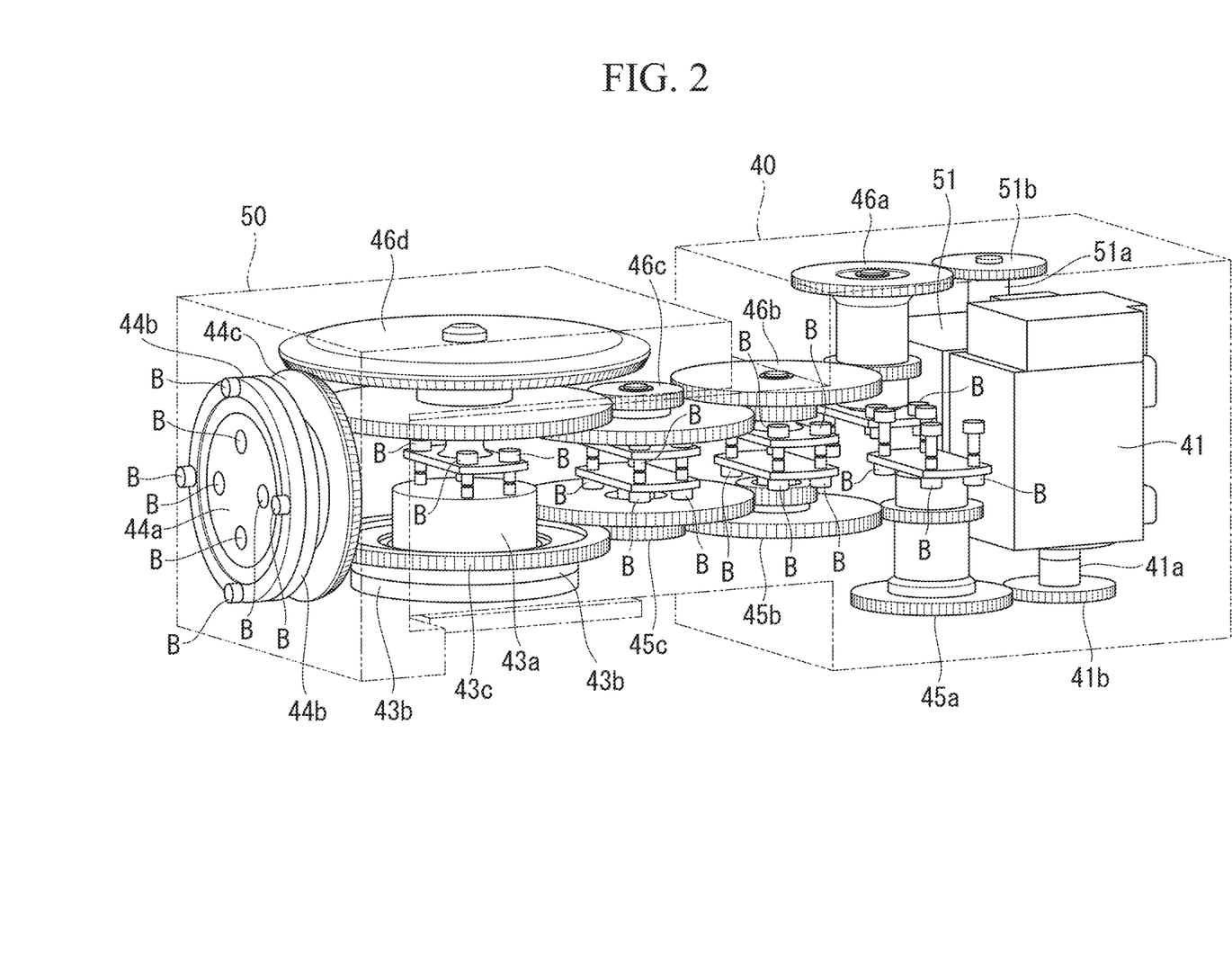
FIG. 2 is a schematic perspective view of primary components of the arm structure of the present embodiment.
Figure 3:
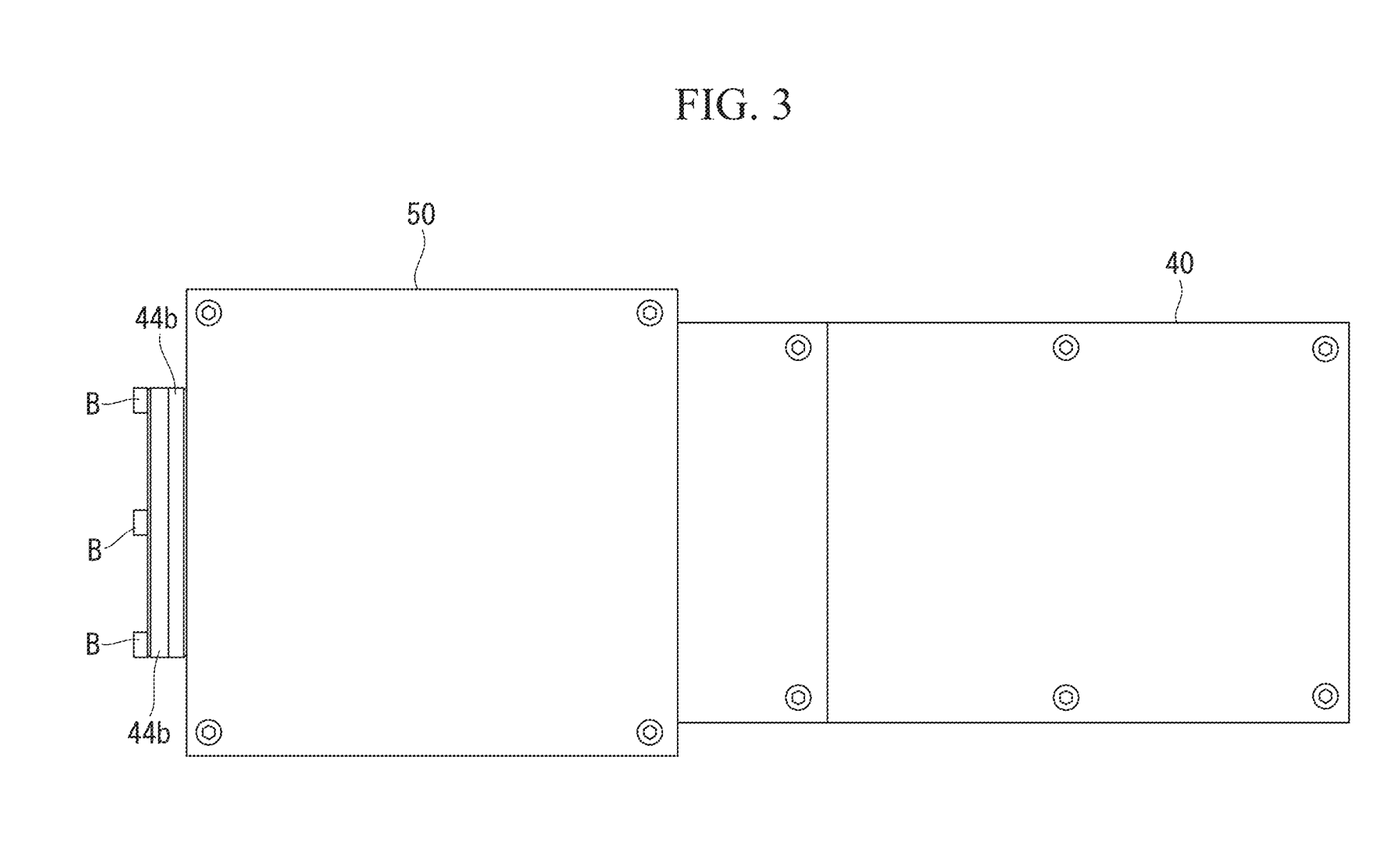
FIG. 3 is a front view of two arm members to which the arm structure of the present embodiment is applied.
Figure 4:
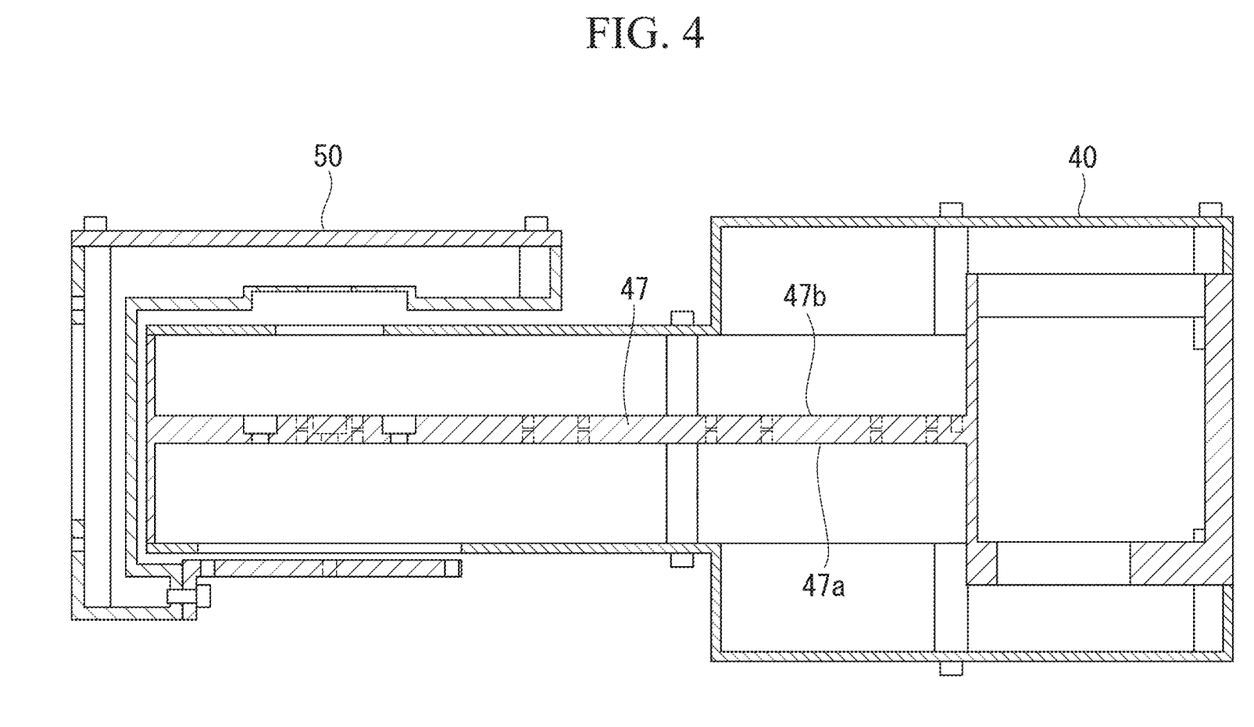
FIG. 4 is a cross-sectional view of the two arm members of FIG. 3 with certain components such as motors and gears being omitted.

The servomotor 41 as the first motor and the servomotor 51 as the second motor are attached to the proximal end of the arm member 40 with bolts or the like (not shown in the figure). Depending on circumstances, at least one of the servomotor 41 and the servomotor 51 may be provided at the intermediate portion of the arm member 40. Hereinafter, the servomotor 41 is referred to as the first motor, and the servomotor 51 is referred to as the second motor. An output shaft 41a of the first motor 41 projects from the first motor 41 in a direction opposite to that of an output shaft 51a of the second motor 51 projecting from the second motor 51. An output gear 41b is attached to the output shaft 41a, and an output gear 51b is attached to the output shaft 51a.

A first bearing 43 is attached to the distal end of the arm member 40. Specifically, one end of a columnar or cylindrical inner shaft 43a is fixed to the distal end of the arm member 40 with bolts B, and an inner ring of the first bearing 43 is attached to an outer surface of the other end of the inner shaft 43a. Further, an outer ring of the first bearing 43 is attached with an outer ring 43b, which is fixed to the intermediate portion of the arm member 50 with bolts B. A center axis of the first bearing 43 coincides with the axis J5. With this structure, the arm member 50 is supported on the arm member 40, and the arm member 50 swings about the axis J5 relative to the arm member 40. The center axis of the first bearing 43 is substantially parallel to a rotational axis of the output shaft 41a of the first motor 41.

A second bearing 44 is attached to the distal end of the arm member 50. Specifically, an outer ring 44b is fixed to the distal end of the arm member 50 with bolts B, and an outer ring of the second bearing 44 is attached to an inner surface of the outer ring 44b. Further, an inner ring of the second bearing 44 is attached to an outer surface of a columnar or cylindrical inner shaft (rotary member) 44a.

In the present embodiment, the inner shaft 44a is fixed to the proximal end of the arm member 60. With this structure, the arm member 60 is supported on the arm member 50, and the arm member 60 rotates about the axis J6 relative to the arm member 50. The inner shaft 44a may constitute a part or whole of the arm member 60.

In the present embodiment, each of the first bearing 43 and the second bearing 44 is a rolling bearing called a cross-roller ring. However, any other rolling bearing may be used as the first bearing 43 and the second bearing 44. The cross-roller ring is a rolling bearing that can receive radial, thrust, and moment loads. Depending on factors such as the size of the robot 1 and kinds of operations performed by the robot 1, any other bearing such as a sliding bearing, a magnetic bearing and a fluid bearing may be used.

A first gear 43c is attached to the intermediate portion of the arm member 50. The first gear 43c is fixed to the outer ring 43b with bolts B and positioned coaxially with the first bearing 43. In the present embodiment, the first gear 43c and the outer ring 43b are fixed to the intermediate portion of the arm member 50 with bolts B.

The first gear 43c may be attached to the arm member 40. For example, an inner ring of a bearing (not shown in the figure) may be attached to an outer surface of an intermediate portion of the inner shaft 43a, and the first gear 43c may be attached to an outer ring of this bearing. In this case too, the outer ring 43b may be directly or indirectly coupled to the first gear 43c so that the outer ring 43b rotates together with the first gear 43c.

To transmit rotation force of the first motor 41 to the first gear 43c, the output gear 41b of the first motor 41 is provided and plural first motor transmission gears 45a, 45b, 45c are attached to the arm member 40. In the present embodiment, the output gear 41b engages with a large-diameter gear wheel of the first motor transmission gear 45a, a small-diameter gear wheel of the first motor transmission gear 45a engages with a large-diameter gear wheel of the first motor transmission gear 45b, a small-diameter gear wheel of the first motor transmission gear 45b engages with a large-diameter gear wheel of the first motor transmission gear 45c, and a small-diameter gear wheel of the first motor transmission gear 45c engages with the first gear 43c. This configuration allows the rotation force of the first motor 41 to be transmitted to the first gear 43c, whereby rotation is decelerated between the first motor 41 and the first gear 43c.

Here, the arm member 40 includes a gear mounting frame 47. The gear mounting frame 47 is a frame extending from the proximal end to the distal end of the arm member 40. In the present embodiment, the gear mounting frame 47 is made of metal, but any other material that can ensure sufficient strength may be used. In the present embodiment, the gear mounting frame 47 includes one side 47a in a thickness direction and the other side 47b facing an opposite direction from the one side 47a. In the gear mounting frame 47, the other side 47b in the thickness direction is provided on the substantially opposite side of the arm member 40 from the one side 47a in the thickness direction. Each of the one side 47a and the other side 47b in the thickness direction may have a flat or irregular surface.

Each of the plural first motor transmission gears 45a, 45b, 45c is attached to the one side 47a in the thickness direction of the gear mounting frame 47 with bolts B. Specifically, each of a spindle of the first motor transmission gear 45a, a spindle of the first motor transmission gear 45b and a spindle of the first motor transmission gear 45c is fixed to the gear mounting frame 47 with bolts B. Further, the first motor transmission gears 45a, 45b, 45c are rotatable about their respective spindles through bearings and the like.

Meanwhile, the second gear 44c is attached to the inner shaft 44a supported on the arm member 50 through the second bearing 44. The second gear 44c is fixed to the inner shaft 44a with bolts and the like, and positioned coaxially with the second bearing 44.

The second gear 44c may be attached to the arm member 50. For example, a spindle having a center axis parallel to the axis J6 may be fixed inside the arm member 50, and the second gear 44c may be attached to an outer ring of a bearing whose inner ring is fixed to the spindle. In this case too, the inner shaft 44a may be directly or indirectly coupled to the second gear 44c so that the inner shaft 44a rotates together with the second gear 44c.

To transmit rotation force of the second motor 51 to the second gear 44c, the output gear 51b of the second motor 51 is provided and plural second motor transmission gears 46a, 46b, 46c, 46d are attached to the arm member 40. In the present embodiment, the output gear 51b engages with a large-diameter gear wheel of the second motor transmission gear 46a, a small-diameter gear wheel of the second motor transmission gear 46a engages with one of gear wheels of the second motor transmission gear 46b, and a small-diameter gear wheel of the second motor transmission gear 46b engages with a large-diameter gear wheel of the second motor transmission gear 46c.

Further, a small-diameter gear wheel of the second motor transmission gear 46c engages with one of gear wheels of the second motor transmission gear 46d, and the other of the gear wheels of the second motor transmission gear 46d engages with the second gear 44c. This configuration allows the rotation force of the second motor 51 to be transmitted to the second gear 44c, whereby rotation is decelerated between the second motor 51 and the second gear 44c.

In the present embodiment, the other of the gear wheels of the second motor transmission gear 46d and the second gear 44c are bevel gears, though any other gear may be used.

Each of the plural second motor transmission gears 46a, 46b, 46c, 46d is attached to the other side 47b in the thickness direction of the gear mounting frame 47 with bolts B.

Specifically, each of a spindle of the second motor transmission gear 46a, a spindle of the second motor transmission gear 46b, a spindle of the second motor transmission gear 46c, and a spindle of the second motor transmission gear 46d are fixed to the gear mounting frame 47 with bolts B. Further, the second motor transmission gears 46a, 46b, 46c, 46d are rotatable about their respective spindles through bearings and the like.

That is, the first motor transmission gears 45a, 45b, 45c are positioned on one side of the gear mounting frame 47, and the second motor transmission gears 46a, 46b, 46c, 46d are positioned on the other side of the gear mounting frame 47 that is opposite from the one side.

In the arm structure configured as above, rotation of the first motor 41 causes the arm member 50 to swing about the axis J5 relative to the arm member 40. Also, rotation of the second motor 51 causes the arm member 60 to rotate about the axis J6 relative to the arm member 50.

Thus, in the present embodiment, the first motor 41 and the second motor 51 are attached to the arm member 40, which is the proximal arm member. This allows to increase an operational speed of the arm 2 as compared to the case where one of the first motor 41 and the second motor 51 is attached to the arm member 50, which is the distal arm member.

Further, in the present embodiment, the first gear 43c is positioned coaxially with the first bearing 43, and the first bearing 43 has the center axis substantially parallel to the axis of the output shaft 41a of the first motor 41. This allows for usage of spur gears and the like, for improved reverse efficiency, as the plural first motor transmission gears 45a, 45b, 45c to transmit the rotation force of the first motor 41 to the first gear 43c.

The first motor transmission gears 45a, 45b, 45c may be regarded as spur gears each having two gear wheels. The gear wheels of the first motor transmission gears 45a, 45b, 45c each may also be regarded as spur gears. Also, the second motor transmission gears 46a, 46b, 46c, 46d may be regarded as spur gears each having two gear wheels. The gear wheels of the second motor transmission gears 46a, 46b, 46c, 46d each may also be regarded as spur gears.

In the present embodiment, the plural first motor transmission gears 45a, 45b, 45c are attached to the arm member 40, which is the proximal arm member, and the plural second motor transmission gears 46a, 46b, 46c, 46d are attached to the arm member 40, which is the proximal arm member. The plural first motor transmission gears 45a, 45b, 45c are spur gears, and the plural second motor transmission gears 46a, 46b, 46c, which are those positioned closer to the second motor 51 among the plural second motor transmission gears 46a, 46b, 46c, 46d, are spur gears.

Use of these spur gears is advantageous in smoothly transmitting the rotation force from the first gear 43c to the first motor 41 and the rotation force from the second gear 44c to the second motor 51.

The second motor transmission gear 46d may be attached to the arm member 50. In this case too, aligning the rotational axis of the second motor transmission gear 46d with the axis J5 allows to transmit the rotation force from the second motor 51 to the second gear 44c. Thus, the same effects as described above can be achieved when the plural second motor transmission gears 46a, 46b, 46c, 46d are supported on the arm member 40 and the arm member 50.

Only one first motor transmission gear 45a may be used from among the first motor transmission gears 45a, 45b, 45c, and only one second motor transmission gear 46d may be used from among the second motor transmission gears 46a, 46b, 46c, 46d. In this case too, the same effects as described above can be provided when the small-diameter gear wheel of the first motor transmission gear 45a engages with the first gear 43c and one of the gear wheels of the second motor transmission gear 46d engages with the output gear 51b of the second motor 51.

The present embodiment has exemplarily described the arm member 40 as the proximal arm member and the arm member 50 as the distal arm member. However, the arm member 20 may be the proximal arm member, and the arm member 30 may be the distal arm member. In this case, the rotary member 44a is fixed to the proximal end of the arm member 40. Further, the outer ring 43b is fixed to the proximal end of the arm member 30, which is the distal arm member. This configuration can also achieve the same effects as described above.

Also, the combination of the proximal arm member and the distal arm member may be chosen from other arm members of the arm 2 of the robot 1.

The present embodiment has described the articulated robot having six axes. However, the above arm structure is applicable to articulated robots having more than or less than six axes.

From the above-described embodiments, the following aspects of the present disclosure are derived.

An aspect of the present invention provides an arm structure of a robot including: a proximal arm member; a first motor attached to the proximal arm member; a second motor attached to the proximal arm member; a first bearing attached to a distal end of the proximal arm member, the first bearing having a center axis substantially parallel to an axis of an output shaft of the first motor; a distal arm member supported on the distal end of the proximal arm member by the first bearing; a first gear positioned coaxially with the first bearing and rotate together with the first bearing; a first motor transmission gear attached to the proximal arm member, the first motor transmission gear transmitting rotation force of the first motor to the first gear to make the distal arm member swing about the center axis of the first bearing; a second bearing attached to the distal arm member, the second bearing having a center axis perpendicular to the center axis of the first bearing; a rotary member supported on the distal arm member by the second bearing, the rotary member being rotatable relative to the distal arm member; a second gear attached to the rotary member and positioned coaxially with the second bearing; and a second motor transmission gear attached to the proximal arm member or the proximal arm member and the distal arm member, the second motor transmission gear transmitting rotation force of the second motor to the second gear to make the rotary member rotate about the center axis of the second bearing.

In the above aspect, the first motor and the second motor are attached to the proximal arm member. This improves an operational speed of the arm as compared to the case where one of the first motor and the second motor is attached to the distal arm member.

Further, in the above aspect, the first gear is positioned coaxially with the first bearing, and the first bearing has a center axis substantially parallel to an axis of the output shaft of the first motor. This allows for usage of a spur gear and the like, for improved reverse efficiency, as the first motor transmission gear to transmit the rotation force of the first motor to the first gear.

In the above aspect, preferably, the first motor transmission gear includes plural first motor transmission gears attached to the proximal arm member, the second motor transmission gear includes plural second motor transmission gears attached to the proximal arm member or the proximal arm member and the distal arm member, the plural first motor transmission gears are spur gears, and among the plural second motor transmission gears, at least those positioned closer to the second motor are spur gears.

Usage of these spur gears is advantageous in smoothly transmitting the rotation force from the first gear to the first motor and the rotation force from the second gear to the second motor.

In the above aspect, preferably, the proximal arm member includes a frame extending from a proximal end to the distal end of the proximal arm member, the frame includes one side in a thickness direction of the frame and the other side facing a substantially opposite direction from the one side, the plural first motor transmission gears are supported on the one side of the frame, and the plural second motor transmission gears positioned closer to the second motor are supported on the other side of the frame.

In the above aspect, the plural first motor transmission gears are supported on one side in the thickness direction of the frame of the proximal arm member, and the plural second motor transmission gears are supported on the other side facing a substantially opposite direction. In this way, the first motor transmission gears and the second motor transmission gears are positioned by the respective sides of the frame. This allows to reduce inertia moment of the proximal arm member when the proximal arm member rotates about a rotational axis connecting the proximal end and the distal end of the proximal arm member.

According to a second aspect of the present invention, there is provided a robot including the above arm structure of a robot.

According to aforementioned aspects, not only an operational speed of the arm but also reverse efficiency can be improved.

REFERENCE SIGNS LIST

1 Robot
2 Arm
40 Arm member (proximal arm member)
50 Arm member (distal arm member)
41 Servomotor (first motor)
51 Servomotor (second motor)
41a, 51a Output shaft
41b, 51b Output gear
43 First bearing
43c First gear
44 Second bearing
44c Second gear
45a, 45b, 45c First motor transmission gear 46*a*, 46*b*, 46*c*, 46*d* Second motor transmission gear
47 Gear mounting frame
47*a* One side in the thickness direction
47*b* Other side in the thickness direction
70 Controller
80 Tool

The invention claimed is:

1. An arm structure of a robot, the arm structure comprising:
    a proximal arm member;
    a first motor attached to the proximal arm member;
    a second motor attached to the proximal arm member;
    a first bearing attached to a distal end of the proximal arm member, the first bearing having a center axis substantially parallel to an axis of an output shaft of the first motor;
    a distal arm member supported on the distal end of the proximal arm member by the first bearing;
    a first gear positioned coaxially with the first bearing and configured to rotate together with the first bearing;
    a first motor transmission gear attached to the proximal arm member, the first motor transmission gear transmitting rotation force of the first motor to the first gear to make the distal arm member swing about the center axis of the first bearing;
    a second bearing attached to the distal arm member, the second bearing having a center axis perpendicular to the center axis of the first bearing;
    a rotary member supported on the distal arm member by the second bearing, the rotary member being rotatable relative to the distal arm member;
    a second gear attached to the rotary member and positioned coaxially with the second bearing; and
    a second motor transmission gear attached to the proximal arm member or the proximal arm member and the distal arm member, the second motor transmission gear transmitting rotation force of the second motor to the second gear to make the rotary member rotate about the center axis of the second bearing.

2. The arm structure according to claim 1, wherein:
    the first motor transmission gear comprises a plurality of first motor transmission gears attached to the proximal arm member;
    the second motor transmission gear comprises a plurality of second motor transmission gears attached to the proximal arm member or the proximal arm member and the distal arm member;
    the plurality of first motor transmission gears are spur gears; and
    among the plurality of second motor transmission gears, at least those positioned closer to the second motor are spur gears.

3. The arm structure according to claim 2, wherein:
    the proximal arm member includes a frame extending from a proximal end to the distal end of the proximal arm member;
    the frame includes one side in a thickness direction of the frame and the other side facing a substantially opposite direction from the one side;
    the plurality of first motor transmission gears are supported on the one side of the frame; and
    the plurality of second motor transmission gears positioned closer to the second motor are supported on the other side of the frame.

4. A robot comprising:
    an arm structure, the arm structure comprising:
        a proximal arm member;
        a first motor attached to the proximal arm member;
        a second motor attached to the proximal arm member;
        a first bearing attached to a distal end of the proximal arm member, the first bearing having a center axis substantially parallel to an axis of an output shaft of the first motor;
        a distal arm member supported on the distal end of the proximal arm member by the first bearing;
        a first gear positioned coaxially with the first bearing and configured to rotate together with the first bearing;
        a first motor transmission gear attached to the proximal arm member, the first motor transmission gear transmitting rotation force of the first motor to the first gear to make the distal arm member swing about the center axis of the first bearing;
        a second bearing attached to the distal arm member, the second bearing having a center axis perpendicular to the center axis of the first bearing;
        a rotary member supported on the distal arm member by the second bearing, the rotary member being rotatable relative to the distal arm member;
        a second gear attached to the rotary member and positioned coaxially with the second bearing; and
        a second motor transmission gear attached to the proximal arm member or the proximal arm member and the distal arm member, the second motor transmission gear transmitting rotation force of the second motor to the second gear to make the rotary member rotate about the center axis of the second bearing.

* * * * *